United States Patent
Suttle et al.

(10) Patent No.: US 7,426,095 B1
(45) Date of Patent: Sep. 16, 2008

(54) MEDIA DRIVE HAVING A HEAD POSITIONING ASSEMBLY UTILIZING A ROTATABLE AND SLIDABLE NUT ENGAGING A THREADED SCREW

(75) Inventors: Steve Suttle, Broomfield, CO (US); Darryl W. Yeakley, Erie, CO (US)

(73) Assignee: Storage Technology Corporation, Louisville, CO (US)

( * ) Notice: Subject to any disclaimer, the term of this patent is extended or adjusted under 35 U.S.C. 154(b) by 496 days.

(21) Appl. No.: 11/290,162

(22) Filed: Nov. 30, 2005

(51) Int. Cl.
*G11B 5/56* (2006.01)

(52) U.S. Cl. .................................. 360/291.2
(58) Field of Classification Search ... 360/291.2–291.3, 360/261.3
See application file for complete search history.

(56) References Cited

U.S. PATENT DOCUMENTS

| | | | |
|---|---|---|---|
| 3,581,966 A | 6/1971 | Huber | |
| 3,705,270 A | 12/1972 | Huber | |
| 4,314,296 A * | 2/1982 | Whittle | 360/241.1 |
| 4,340,919 A * | 7/1982 | Kato | 360/291.2 |
| 4,809,099 A | 2/1989 | Murphy et al. | |
| 5,105,322 A | 4/1992 | Steltzer | |
| 5,331,490 A | 7/1994 | Richards et al. | |
| 5,448,438 A | 9/1995 | Kasetty | |
| 5,537,275 A | 7/1996 | Peace et al. | |
| 5,726,834 A | 3/1998 | Eckberg et al. | |

* cited by examiner

Primary Examiner—A. J. Heinz
(74) Attorney, Agent, or Firm—Brooks Kushman P.C.

(57) ABSTRACT

A media drive having a deck and a head positioning assembly. The deck has a first threaded hole. The head positioning assembly includes a baseplate having an aperture, a nut having a second threaded hole, and an adjustment screw having first and second threaded portions. The nut rotates about an axis of rotation and slides within the aperture to align the first and second threaded portions with the first and second threaded holes, respectively.

20 Claims, 3 Drawing Sheets

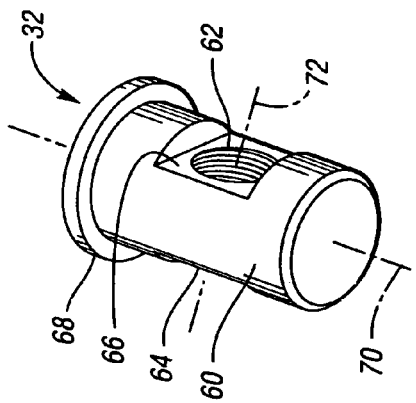
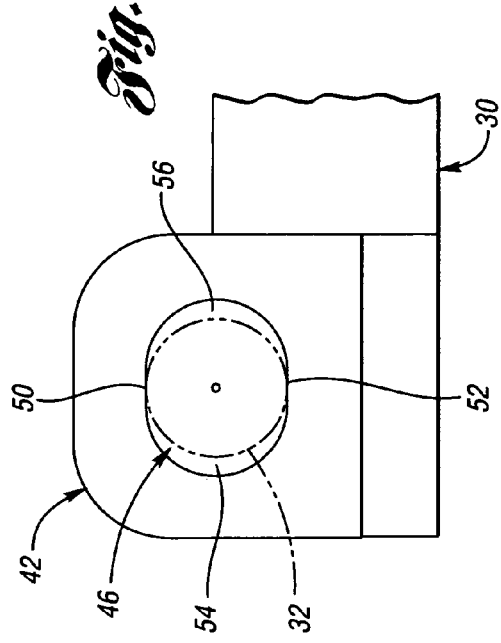
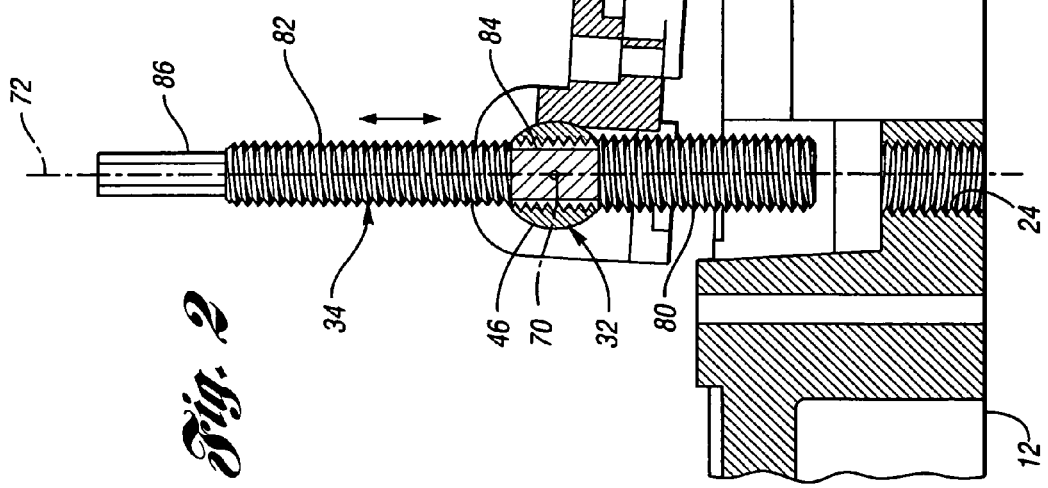

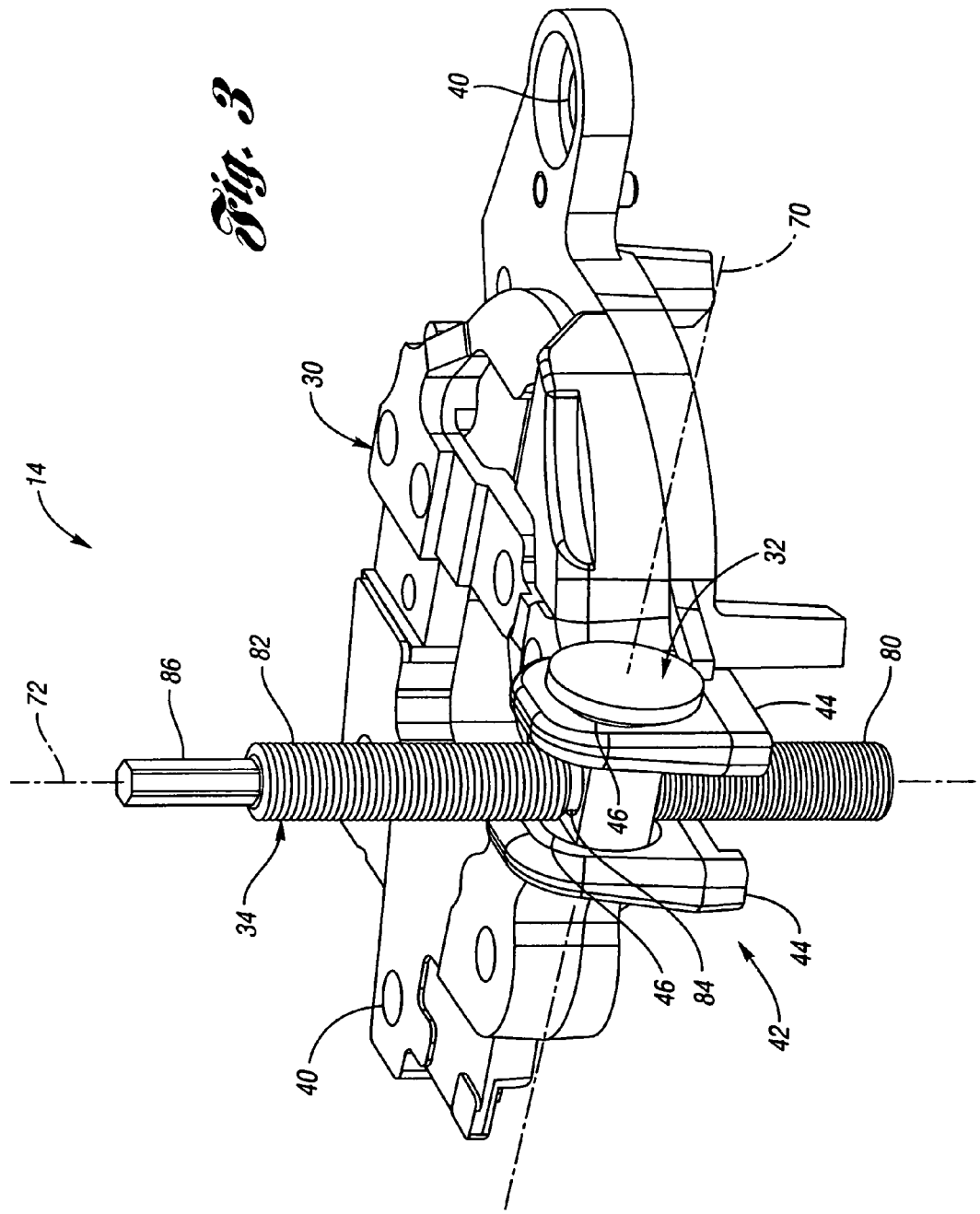

MEDIA DRIVE HAVING A HEAD POSITIONING ASSEMBLY UTILIZING A ROTATABLE AND SLIDABLE NUT ENGAGING A THREADED SCREW

BACKGROUND OF THE INVENTION

1. Field of the Invention

The present invention relates to a media drive, and more particularly to a media drive having a head positioning assembly.

2. Background Art

An apparatus for positioning a magnetic tape head relative to a length of magnetic tape is disclosed in U.S. Pat. No. 5,105,322.

SUMMARY OF THE INVENTION

In at least one embodiment of the present invention, a media drive is provided. The media drive includes a deck and a head positioning assembly. The deck has a first threaded hole. The head positioning assembly has a baseplate, a nut, and an adjustment screw. The baseplate is disposed adjacent to the deck and includes a mounting bracket having a first aperture. The nut is moveably disposed in the first aperture and has a second threaded hole. The adjustment screw extends through the second threaded hole and includes first and second threaded portions. The nut rotates about an axis of rotation and slides within the first aperture to align the first and second threaded portions with the first and second threaded holes, respectively, to inhibit cross-threading when the adjustment screw is turned.

In at least one other embodiment of the present invention, a media drive is provided. The media drive includes a deck, a head positioning assembly, and a read/write head disposed adjacent to the head positioning assembly. The deck has a first threaded hole. The head positioning assembly has a baseplate, a nut, and an adjustment screw. The baseplate is disposed adjacent to the deck and has a mounting bracket. The mounting bracket includes a first aperture having first and second generally planar surfaces that are disposed opposite each other. The nut is movably disposed in the first aperture and has a second threaded hole. The adjustment screw extends through the second threaded hole and includes first and second threaded portions. The nut is rotatable about an axis of rotation and is moveable along at least one of the first and second generally planar surfaces to align the first and second threaded portions with the first and second threaded holes, respectively, to inhibit cross-threading when the adjustment screw is rotated to position to the read/write head.

In at least one other embodiment of the present invention, a media drive is provided. The media drive includes a deck having a first threaded hole, a read/write head, and a head positioning assembly. The head positioning assembly includes a baseplate, a nut, and an adjustment screw. The baseplate receives the read/write head and is disposed adjacent to the deck. The baseplate has a mounting bracket that includes a first aperture. The nut is disposed along a first axis and extends through the first aperture. The nut has a second threaded hole disposed along a second axis. The adjustment screw extends through the second threaded hole along the second axis. The read/write head is positioned by rotating the adjustment screw. The adjustment screw is positioned in a first direction by rotating the nut about the first axis, positioned in a second direction by sliding the nut within the first aperture, and positioned in a third direction by rotating the adjustment screw about the second axis.

BRIEF DESCRIPTION OF THE DRAWINGS

FIG. 2 is a fragmentary section view of a portion of the media drive along section line 2-2 shown in FIG. 1.

FIG. 3 is a perspective view of the head positioning assembly shown in FIG. 1.

FIG. 4 is a fragmentary side view of a portion of a baseplate and a nut that may be provided with the head positioning assembly.

FIG. 5 is a perspective view of the nut.

DETAILED DESCRIPTION

Figure 1:
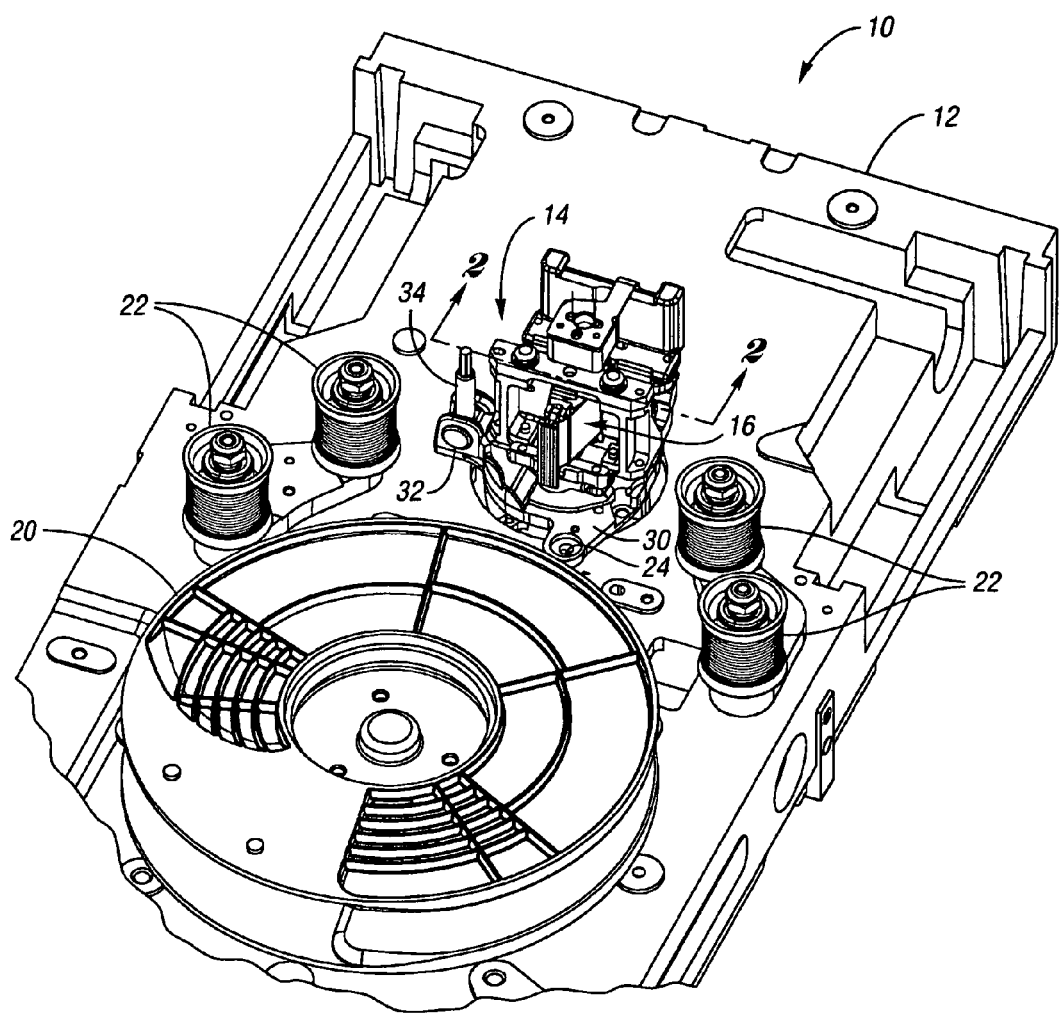
FIG. 1 is a fragmentary perspective view of a media drive having a head positioning assembly.

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Referring to FIG. 1, an exemplary media drive 10 is shown. The media drive 10 may be configured to actuate, access, and/or store data on any suitable media, such as a disk or tape. The media drive 10 may have any suitable configuration. In the embodiment shown, the media drive 10 includes a deck 12, a head positioning assembly 14, and a read/write head 16 for accessing and/or storing data on the media.

The deck 12 may have any suitable configuration. For example, the deck 12 may be configured to receive the media, which may be provided in a media cartridge. In addition, the deck 12 may also include an actuating mechanism that directly or indirectly actuates the media. In the embodiment shown, the deck 12 is configured to receive a cartridge that holds an optical or magnetic tape and includes a drive unit 20 that may actuate (e.g., rotate) a spool upon which the tape is wound. In addition, the deck 12 may include a plurality of rollers 22 that help guide the media along a path and past the read/write head 16 to facilitate storage and/or retrieval of data. The deck 12 may also receive the head positioning assembly 14 and include one or more threaded holes 24. Each threaded hole 24 may receive a fastener or a portion of the head positioning assembly 14 to help secure and/or position the head positioning assembly 14 and the read/write head 16.

Referring to FIGS. 2-3, the head positioning assembly 14 is shown in more detail. The head positioning assembly 14 may include a baseplate 30, a nut 32, and an adjustment screw 34.

The baseplate 30 may be disposed adjacent to the deck 12 and may have any suitable configuration. For example, the baseplate 30 may include a plurality of attachment holes 40 and a mounting bracket 42.

The attachment holes 40 may extend through the baseplate 30. Each attachment hole 40 may receive a fastener, such as a screw. In at least one embodiment, a fastener may extend through each attachment hole 40 and engage an associated threaded hole 24 in the deck 12.

The mounting bracket 42 may have any suitable configuration. For example, the mounting bracket 42 may be integrally formed with the baseplate 30 or may be provided as a separate component that is attached to the baseplate 30 in any suitable manner, such as with an adhesive, fastener, or by welding. The mounting bracket 42 may include one or more mounting portions 44. In the embodiment shown, two mounting portions 44 are provided that are spaced apart from each other and extend generally perpendicular to the baseplate 30.

Each mounting portion 44 may include an aperture 46 that may have any suitable configuration. As is best shown in FIG. 4, the aperture 46 may be configured as an elongated slot and may include one or more pairs of opposing surfaces. The opposing surfaces may include any suitable combination of generally planar and/or non-planar surfaces. In the embodiment shown, the aperture 46 includes first and second generally planar surfaces 50,52 and first and second curved surfaces 54,56. The first and second curved surfaces 54,56 may extend from opposite ends of first and second planar surfaces 50,52. Of course, the present invention also contemplates other embodiments, such as an aperture configured as a generally rectangular slot.

Referring to FIGS. 4 and 5, the nut 32 is shown in more detail. The nut 32 may be made of any suitable material, such as a metal like stainless steel. The nut 32 may have any suitable configuration. For example, the nut 32 may include an outer surface 60, a threaded hole 62, a first flat surface 64, a second flat surface 66, and at least one flange 68.

The outer surface 60 may be generally smooth and may have a generally cylindrical configuration. More specifically, the outer surface 60 may be centered about a first axis 70, also referred to as a first axis of rotation 70. The outer surface 60 may move (e.g., slide and/or rotate) along a portion of the aperture 46, such as the first and/or second flat surfaces 50,52 as will be described in more detail below.

The threaded hole 62 may extend through the nut 32 and may be centered or disposed about a second axis 72, also referred to as a second axis of rotation with reference to the adjustment screw 34. The second axis 72 may be disposed generally perpendicular to the first axis 70. The threaded hole 62 may be provided with one or more threads that extend at least partially between the first and second ends of the threaded hole 62.

The first and second flat surfaces 64,66 may be disposed adjacent to the threaded hole 62. More specifically, a first flat surface 64 may be disposed adjacent to a first end of the threaded hole 62 and a second flat surface 66 may be disposed adjacent to a second end of the threaded hole 62.

The flange 68 may be provided to inhibit movement of the nut 32. More specifically, the flange 68 may have a larger diameter than the outer surface 60 to inhibit movement of the nut 32 along the first axis 70 when the flange 68 contacts the mounting bracket 42 or another suitable surface. The flange 68 may be disposed in any suitable location, such as proximate an end of the nut 32. Alternatively, the flange 68 may be spaced apart from the end of the nut 32 in one or more embodiments of the present invention.

Referring again to FIG. 3, an exemplary adjustment screw 34 is shown. The adjustment screw 34 may be made of any suitable material, such as a metal like stainless steel. In addition, the adjustment screw 34 may have any suitable configuration. In the embodiment shown, the adjustment screw 34 includes a first threaded portion 80, a second threaded portion 82, an intermediate portion 84, and a tool engagement feature 86.

The first threaded portion 80 may be disposed proximate an end of the adjustment screw 34. In addition, the first threaded portion 80 may be configured to be threaded into or out of the threaded hole 24 in the deck 12 to adjust the position of the read/write head 16 as will be described in more detail below.

The second threaded portion 82 may be spaced apart from the first threaded portion 80. The second threaded portion 82 may include one or more threads that are compatible with the threaded hole 62 of the nut 32. In addition, the second threaded portion 82 may have the same or different thread pitch as the first threaded portion 80. In one exemplary embodiment, the first threaded portion 80 may have eight threads per inch while the second threaded portion may have six threads per inch. Providing different thread pitches may help inhibit cross-threading and may help improve the resolution of adjustments in the position of the read/write head 16. The second threaded portion 82 may have the same or different diameter than the first threaded portion 80. In the embodiment shown, the second threaded portion 82 has a smaller diameter than the first threaded portion 80.

The intermediate portion 84 may be disposed between the first and second threaded portions 80,82. The intermediate portion 84 may have a generally cylindrical outer surface. In addition, the intermediate portion 84 may have a smaller diameter than the first threaded portion 80, the second threaded portion 82, and the threaded hole 62.

The tool engagement feature 86 may be provided to facilitate rotation of the adjustment screw 34. More specifically, the tool engagement feature 86 may allow a compatible tool to engage and actuate the adjustment screw 34. The tool engagement feature 86 may have any suitable configuration, such as a male or a female configuration. In the embodiment shown, the tool engagement feature 86 has a male configuration and is equipped with a hex head for engagement by a socket or wrench. Alternatively, the tool engagement feature 86 may accommodate a differently configured tool, such as a square, star, slotted, Phillips, or Torx® bit. The tool engagement feature 86 may be disposed in any suitable location, such as proximate the second threaded portion 82.

Referring primarily to FIG. 2, the operation of the head positioning assembly 14 and positioning of the read/write head 16 will now be described in more detail. In at least one embodiment, the head positioning assembly 14 may be assembled and operated as follows.

First, the nut 32 is inserted into the mounting bracket 42. In the embodiment shown in FIG. 2, the nut 32 is inserted through the apertures 46 such that the threaded hole 62 of the nut 32 is disposed between the mounting portions 44.

Second, the adjustment screw 34 is threaded into the nut 32. More specifically, the second threaded portion 82 may be threaded through the threaded hole 62 of the nut 32 such that the intermediate portion 84 is disposed within the threaded hole 62. Since the intermediate portion 84 has a smaller diameter than the threaded hole 62, the adjustment screw 34 may move slightly within the threaded hole 62 when disposed in this position.

Third, the baseplate 30 is positioned adjacent to the deck 12. More specifically, the baseplate 30 may be positioned such that the attachment holes 40 are aligned with corresponding apertures in the deck 12. In addition, the baseplate 30 may be oriented at an angle relative to the deck 12 to permit sufficient threading of the first threaded portion 80 into the threaded hole 24.

Fourth, the adjustment screw 34 may be positioned or generally aligned with the threaded hole 24. More specifically, the adjustment screw 34 may be positioned by moving (e.g., sliding) the nut 32 within the mounting bracket aperture 46 and/or by rotating the nut 32 about the first axis 70. Movement of the nut 32 and/or adjustment screw 34 may help the first and second threaded portions 80,82 to self-align with their associated threaded holes 24,62, thereby reducing the likelihood of cross-threading. The reduction or elimination of cross-threading helps prevent damage to head positioning assembly components, thereby reducing scrap and repair costs.

Fifth, the adjustment screw 34 is threaded into the threaded hole 24 in the deck 12. More specifically, the adjustment screw 34 is rotated about the second axis of rotation 72 to thread the first threaded portion 80 into the threaded hole 24. Engagement of the first threaded portion 80 with the threaded hole 24 may be accomplished before threading the second threaded portion 82 into the threaded hole 62 of the nut 32. As such, the adjustment screw 34 may move relative to the deck 12 when rotated, but may not initially alter the positioning of the baseplate 30. Sequential engagement of the threaded portions may help simplify thread alignment and help reduce cross-threading associated with engaging media drive components that may change angles or positioning relative to each other.

Sixth, the adjustment screw 34 is threaded into the threaded hole 62 of the nut 32. More specifically, the adjustment screw 34 may be rotated about the second axis of rotation 72 to thread the second threaded portion 82 into the threaded hole 62. In addition, rotation of the adjustment screw 34 may continue to thread the first threaded portion 80 into the threaded hole 24 in the deck 12. By aligning and/or engaging the first and second threaded portions 80,82 sequentially, the likelihood of cross-threading may be reduced as compared with starting to thread both threaded portions 80,82 simultaneously.

Seventh, the adjustment screw 34 may be rotated to position the head positioning assembly 14 and the read/write head 16. Positioning of the read/write head 16 may be accomplished by rotating the adjustment screw 34 to raise or lower the baseplate 30 and read/write head 16 relative to the media and/or the deck 12. Raising or lowering the baseplate 30 in this manner may alter an angle of orientation of the read/write head 16, such as an azimuth angle as is known by those skilled in the art. The present invention may be designed to facilitate positioning adjustments with a high degree of resolution and accuracy. For example, the present invention may permit azimuth angle adjustments with a resolution of less than one arcminute. Moreover, the reduction or elimination of cross-threading helps eliminate a primary cause of reliability and repeatability problems in azimuth angle adjustments.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A media drive comprising:
    a deck having a first threaded hole; and
    a head positioning assembly including:
        a baseplate disposed adjacent to the deck and having a mounting bracket that includes a first aperture;
        a nut moveably disposed in the first aperture and having a second threaded hole; and
        an adjustment screw that extends through the second threaded hole and includes first and second threaded portions;
    wherein the nut rotates about an axis of rotation and slides within the first aperture to align the first and second threaded portions with the first and second threaded holes, respectively, to inhibit cross-threading when the adjustment screw is turned.

2. The media drive of claim 1 wherein the first aperture is defined by first and second generally planar surfaces disposed opposite each other and first and second curved surfaces extending from opposite ends of the first and second generally planar surfaces.

3. The media drive of claim 1 wherein the adjustment screw further comprises a tool engagement feature disposed at an end of the adjustment screw disposed opposite the first threaded portion.

4. The media drive of claim 1 wherein the adjustment screw further comprises an intermediate portion disposed between the first and second threaded portions, the intermediate portion having a smaller diameter than the second threaded hole.

5. The media drive of claim 1 wherein the adjustment screw further comprises an intermediate portion disposed between the first and second threaded portions, the intermediate portion having a smaller diameter than the first and second threaded portions.

6. The media drive of claim 1 wherein the nut has a generally cylindrical outer surface that permits the nut to rotate and slide within the first aperture.

7. The media drive of claim 1 wherein the mounting bracket further comprises first and second apertures that cooperate to receive the nut, the first and second apertures being coaxially arranged, spaced apart from each other, and disposed generally perpendicular to the deck.

8. The media drive of claim 1 wherein the nut further comprises a flange that limits movement of the nut along the axis when the flange contacts the mounting bracket.

9. The media drive of claim 1 further comprising a read/write head disposed adjacent to the baseplate.

10. The media drive of claim 1 wherein the second threaded hole is disposed generally perpendicular to the axis of rotation.

11. A media drive comprising:
    a deck having a first threaded hole;
    a head positioning assembly including:
        a baseplate disposed adjacent to the deck and having a mounting bracket that includes a first aperture having first and second generally planar surfaces disposed opposite each other;
        a nut moveably disposed in the first aperture and having a second threaded hole; and
        an adjustment screw that extends through the second threaded hole and includes first and second threaded portions; and
    a read/write head disposed adjacent to the head positioning assembly;
    wherein the nut is rotatable about an axis of rotation and moveable along at least one of the first and second generally planar surfaces to align the first and second threaded portions with the first and second threaded holes, respectively, to inhibit cross-threading when the adjustment screw is rotated to position the read/write head.

12. The media drive of claim 11 wherein the adjustment screw further comprises an intermediate portion disposed between the first and second threaded portions, the intermediate portion having a smaller diameter than the first and second threaded portions.

13. The media drive of claim 12 wherein the intermediate portion has a smooth outer surface and a smaller diameter than the second threaded hole.

14. The media drive of claim 11 wherein the first threaded portion and the first threaded hole have a different thread pitch than the second threaded portion and the second threaded hole to improve adjustment resolution when positioning the read/write head.

15. The media drive of claim 11 wherein the nut further comprises first and second flat surfaces disposed adjacent to first and second ends of the second threaded hole, respectively.

16. The media drive of claim 11 wherein the nut further comprises a flange for limiting movement of the nut along the axis of rotation.

17. A media drive comprising:
- a deck having a first threaded hole;
- a read/write head; and
- a head positioning assembly including:
  - a baseplate that receives the read/write head and is disposed adjacent to the deck, the baseplate having a mounting bracket that includes a first aperture;
  - a nut disposed along a first axis and extending through the first aperture, the nut having a second threaded hole disposed along a second axis; and
  - an adjustment screw that extends through the second threaded hole along the second axis;
- wherein the read/write head is positioned by rotating the adjustment screw and the adjustment screw is positioned in a first direction by rotating the nut about the first axis, positioned in a second direction by sliding the nut within the first aperture, and positioned in a third direction by rotating the adjustment screw about the second axis.

18. The media drive of claim 17 wherein the adjustment screw further comprises a first threaded portion, a second threaded portion, and an intermediate portion disposed adjacent to the first and second threaded portions, wherein the intermediate portion is disposed within the second threaded hole when the first threaded portion engages the first threaded hole.

19. The media drive of claim 17 wherein the adjustment screw further comprises first and second threaded portions, wherein the first threaded portion is threaded into the first threaded hole before the second threaded portion is threaded into the second threaded hole.

20. The media drive of claim 19 wherein the baseplate is positioned in a non-parallel relationship with the deck when the first threaded portion is threaded into the first threaded hole.

* * * * *